W. L. WAYRYNEN.
TIRE PATCH.
APPLICATION FILED FEB. 7, 1916.
1,224,248.
Patented May 1, 1917.
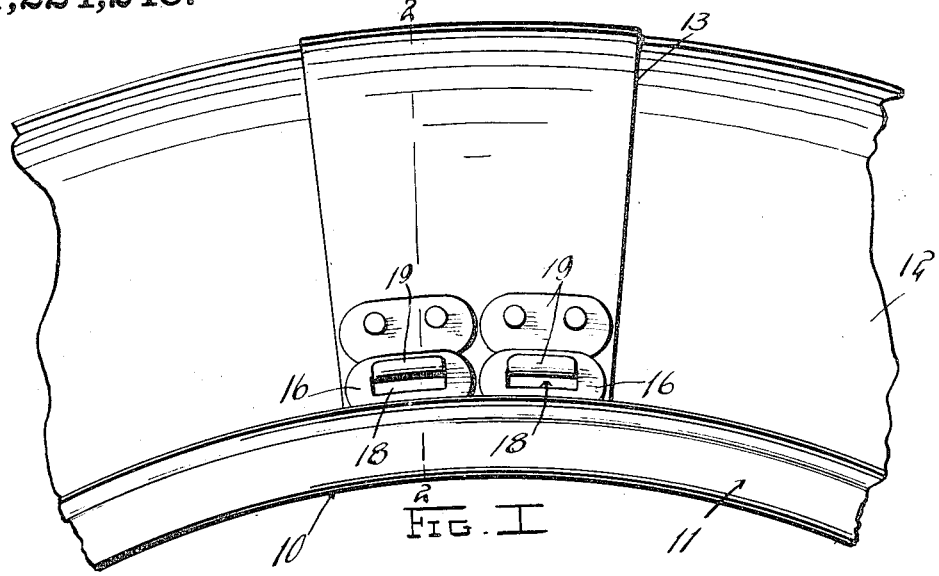
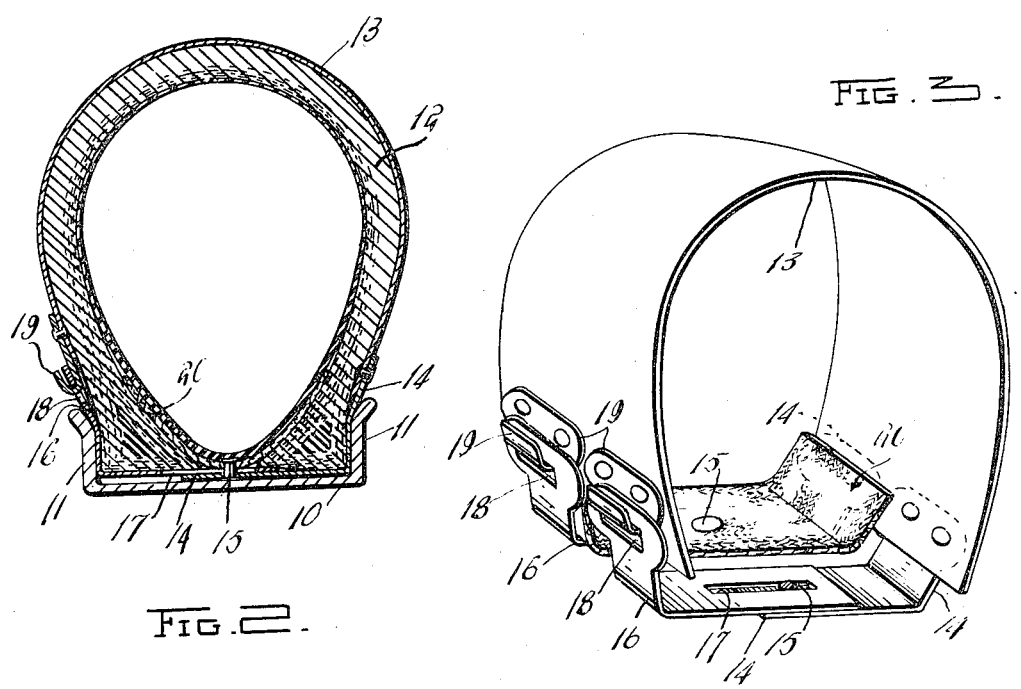
Witnesses
Inventor
W. L. Wayrynen.
By Chandler & Chandler
Attorneys

UNITED STATES PATENT OFFICE.

WILLIAM L. WAYRYNEN, OF LAKE NORDEN, SOUTH DAKOTA.

TIRE-PATCH.

1,224,248.  Specification of Letters Patent.  Patented May 1, 1917.

Application filed February 7, 1916. Serial No. 76,683.

*To all whom it may concern:*

Be it known that I, WILLIAM L. WAYRY- NEN, a citizen of the United States, residing at Lake Norden, in the county of Hamlin, State of South Dakota, have invented certain new and useful Improvements in Tire-Patches; and I do hereby declare the following to be a full, clear, and exact description of the invention, such as will enable others skilled in the art to which it appertains to make and use the same.

This invention relates to improvements in repair devices, and particularly to repair devices for automobile tires.

Another object is to provide a novel and efficient device of this character which will hold a blow-out or rim cut.

A still further object is to provide a novel and efficient device of this character which can be quickly and easily applied to a tire, and which will be securely held by the tire and rim to prevent displacement.

Other objects and advantages will be apparent from the following description when taken in connection with the accompanying drawing.

In the drawing:

Figure 1 is a side elevation of a portion of a tire and wheel showing my repair patch applied thereto;

Fig. 2 is a vertical section on the line 2—2 of Fig. 1; and

Fig. 3 is a perspective view of the repair patch removed from the tire.

Referring particularly to the accompanying drawing, 10 represents a portion of the rim of the wheel having the vertically extending flanges 11, between which is disposed the tire 12. Engaged transversely over the tire is a strip of leather or other suitable material 13 having riveted to one end the angle plates 14. These angle plates are seated snugly within the rim and against one of the side flanges 11, the longer portion of said plate extending transversely of the rim and carrying a rivet 15 adjacent the outer end thereof. A second pair of angle plates 16 are seated in the opposite side of the rim and have their longer portions longitudinally slotted as at 17 to receive slidably therein the rivets 15 of the plates 14. The vertical portions of the angle plates 16 are formed with transversely extending slots 18 which receive the hooks 19 secured to the adjacent end of the leather strip 13. These plates 14 and 16, as clearly shown in the drawing are disposed between the rim and the rim engaging portion of the tire, and by reason of the angularity of the plates any tendency of the same to move transversely around the tire by the strip 13 will be effectively prevented.

Secured to the plates 14 and 16 by means of the rivets 15 is a piece of canvas or other suitable fabric 20 which is arranged to be disposed between the inner tube and outer shoe of the tire, as clearly seen in Fig. 2. This protects the inner tube from coming into contact with the plates 14 and 16 and their rivets 15.

While I have shown the patch as used in connection with a straight side tire, I wish it to be understood that the same can be used, with other types of tires with slight modifications to the structure within the scope of the claims.

What is claimed is:

1. A protective device for tires comprising a tire encircling shoe including a flexible, non-elastic tread embracing web, and expansible means connecting the ends of the web to spread upon inflation of the tire and seat snugly within a wheel rim.

2. A protective device for tires comprising a tire encircling shoe including a web portion, and relatively movable members connecting the ends of the web and expansible upon inflation of the tire to seat therewith snugly in a wheel rim.

3. A protective device for pneumatic tires comprising a tread portion, means connecting the ends of said tread portion and expansible to seat snugly within a wheel rim, and a protective flap carried by said expansible means and insertible within a tire between it and the inner tube.

4. A protective device for pneumatic tires comprising a tread portion, overlapping plates carried by one end of the tread portions and detachably engaged with the other end thereof, means connecting said plates for movement with respect to each other, and a protective flap carried by said means for insertion within a tire between it and the inner tube.

5. A tire patch comprising a tire embracing web, a hook member carried by one end of the web, angle members for engagement under the tire and adapted to fit snugly within a wheel rim, said angle members being slidably connected together and immovably connected to the other end of the web, and an eye portion carried by one of the angle members for detachably receiving said hook member.

6. A protective device for tires comprising a tire encircling shoe including a web portion, relatively movable members one of which is connected with one end of the web, and means detachably connecting the other members with the other end of the web, said relatively movable members being expansible upon inflation of the tire to seat therewith snugly in a wheel rim.

In testimony whereof, I affix my signature, in the presence of two witnesses.

WILLIAM L. WAYRYNEN.

Witnesses:
D. F. SCOTT,
H. S. BEDFORD.

Copies of this patent may be obtained for five cents each, by addressing the "Commissioner of Patents, Washington, D. C."